US012197434B2

(12) United States Patent
Campbell et al.

(10) Patent No.: US 12,197,434 B2
(45) Date of Patent: Jan. 14, 2025

(54) ACCOUNT MERGING AND MIGRATION WITH REDUCED ERROR RATES

(71) Applicant: FanDuel Limited, Edinburgh (GB)

(72) Inventors: Edwin A. Campbell, Edinburgh (GB);
Calum Haszeldine, Edinburgh (GB);
Derek R. Masson, Aberdeen (GB);
Andreas Iatropoulos, Edinburgh (GB);
Cameron Doyle, Edinburgh (GB);
Leanne Mckenzie, Edinburgh (GB);
Mathieu Patureau Mirand, Edinburgh (GB)

(73) Assignee: FanDuel Limited, Edinburgh (GB)

( * ) Notice: Subject to any disclaimer, the term of this patent is extended or adjusted under 35 U.S.C. 154(b) by 2 days.

(21) Appl. No.: 18/224,832

(22) Filed: Jul. 21, 2023

(65) Prior Publication Data
US 2023/0359616 A1 Nov. 9, 2023

Related U.S. Application Data

(63) Continuation of application No. 17/364,235, filed on Jun. 30, 2021, now Pat. No. 11,748,344.

(51) Int. Cl.
| | | |
|---|---|---|
| *G06F 16/24* | (2019.01) | |
| *G06F 7/14* | (2006.01) | |
| *G06F 16/245* | (2019.01) | |
| *G06N 20/00* | (2019.01) | |
| *G06Q 10/10* | (2023.01) | |
| *H04L 67/306* | (2022.01) | |

(52) U.S. Cl.
CPC .............. *G06F 16/245* (2019.01); *G06F 7/14* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2011/0125770 A1* | 5/2011 | Battestini | G06Q 10/00 707/758 |
| 2015/0205842 A1* | 7/2015 | Jain | G06Q 10/10 707/732 |
| 2020/0372016 A1* | 11/2020 | Rogynskyy | H04L 67/1095 |

OTHER PUBLICATIONS

Susan Gauch; User Profiles for Personailized Information Access; The Adaptive Web; pp. 54-89 (Year: 2007).*

* cited by examiner

*Primary Examiner* — Albert M Phillips, III
*Assistant Examiner* — Jermaine A Mincey
(74) *Attorney, Agent, or Firm* — Erise IP, P.A.

(57) ABSTRACT

Computer-readable media, methods, and systems for comparing and migrating multiple online user accounts from multiple online platforms while reducing the probability of false mergers. At least one first online platform comprising a plurality of online accounts associated with the first online platform may be compared with at least one second online platform comprising a plurality of online accounts associated with the second online platform. The comparison further includes comparing the one or more fields of personally identifiable information associated with the first user and the one or more fields of personally identifiable information associated with the second user while excluding known improbable values. Following the comparison between the online accounts, a migration outcome may be determined for creating a new online account, migrating online accounts across online platforms, or consolidating online accounts.

20 Claims, 4 Drawing Sheets

ACCOUNT MERGING AND MIGRATION WITH REDUCED ERROR RATES

RELATED APPLICATIONS

This patent application is a continuation application claiming priority benefit, with regard to all common subject matter, of commonly assigned and concurrently filed U.S. patent application Ser. No. 17/364,235, filed Jun. 30, 2021, and entitled "ACCOUNT MERGING AND MIGRATION WITH REDUCED ERROR RATES." The above referenced patent application is hereby incorporated by reference in its entirety into the present application.

TECHNICAL FIELD

Embodiments of the invention relate to comparing, merging, and migrating online accounts from multiple online platforms and for reducing the rate of error during migration.

In an ever-increasing digital world, a likewise ever-growing number of online services and platforms require users to sign-up or register online accounts associated with each of the online services and platforms. Oftentimes, individual users have multiple online accounts over a plurality of online platforms, which providers may wish to merge, integrate, or otherwise de-duplicate. In response, methods of comparing, merging, and migrating online accounts spread across multiple online platforms to a single online platform have been developed and implemented. However, traditional methods of identifying when two online accounts are associated with the same user (and therefore should be merges or otherwise consolidated) typically rely on matching information provided by the user, including names, dates of births, other personally identifiable information, as well as account-identifying indicia, such as email addresses or usernames. However, information provided by users may include significant (intentional or accidental) inaccuracies, and reliance on such matching can lead to improper merging or migrating of non-related online accounts, and a significant impact accounts comprising sensitive information, including financial information, for example. Improper mergers or migrations can lead to individual users or businesses being locked out of their accounts, or more significantly, can lead to financial information being shared or disclosed to non-authorized third parties. As such, what is needed is a way to accurately identify related accounts, and to merge or migrate online accounts that reduces or eliminates the frequency of improper account mergers.

SUMMARY

Embodiments of the invention solve the above-mentioned problems by providing techniques for migrating and merging account information sets. In particular, in a first embodiment, the invention includes one or more non-transitory computer-readable media storing computer executable instructions that, when executed by a processor perform a method of comparing and migrating online user accounts, the method comprising retrieving first account information for a first online platform comprising first online account associated with the first online platform, wherein the first online account comprises one or more fields of first user personally identifiable information, retrieving second account information for a second online platform comprising second online account associated with the second online platform, wherein the second online accounts associated with the second online platform comprise one or more fields of second user personally identifiable information, comparing the one or more fields of first user personally identifiable information associated with the at least first one first online account and the one or more fields of second user personally identifiable information associated with the second online account to associate a first user of the first online account with a second user of the second online account, determining an association confidence value indicating a likelihood that the first user of the first online account and the second user of the second online account are a same user, if the association confidence value is below a predetermined threshold, performing a secondary comparison of one or more fields of first user account information and second user account information to further associate the first user of the first online account with the second user of the second online account, based on the first user personally identifiable information, the second user personally identifiable information, the first user account information, the second user account information, first account identifying indicia and second account identifying indicia, assigning an account migration outcome of the first online account and the second online account, and performing the assigned account migration outcome of the first online account and the second online account.

In a second embodiment, the invention includes a method for consolidating one or more online accounts, the method comprising selecting a first online account associated with a first online platform, wherein the first online account comprises one or more fields of first user personally identifiable information associated with a first user of the first online account, performing a first comparison between the first online account with one or more second online accounts associated with a second online platform, wherein each second online account of the one or more second online accounts comprises one or more fields of second user personally identifiable information associated with a second user of the second online account, wherein the first comparison between the first online account and the one or more second online accounts includes comparing the one or more fields of first user personally identifiable information associated with the first user and the one or more fields of second user personally identifiable information associated with the second user of the second online account for each second online account of the one or more second online accounts, determining an association confidence value for each second online account of the one or more second online accounts indicating a likelihood that the first user of the first online account and the second user of the second online account are a same user, if the association confidence value is below a predetermined threshold for each second online account of the one or more second online accounts, performing a secondary comparison of one or more fields of first user account information and second user account information to further associate the first user of the first online account with the second user of the second online account of the one or more second online accounts, based on the first user personally identifiable information, the second user personally identifiable information, the first user account information, the second user account information, first account identifying indicia and second account identifying indicia, assigning an account migration outcome of the first online account and one or more second online accounts, and performing the assigned account migration outcome of the first online account and the one or more second online accounts.

In a third embodiment, the invention includes a system comprising at least one processor and at least one non-transitory memory storing computer executable instructions that, when executed by the processor, cause the system to carry out actions comprising retrieving first account information for a first online platform comprising first online account associated with the first online platform, wherein the first online account comprises one or more fields of first user personally identifiable information, retrieving second account information for a second online platform comprising second online account associated with the second online platform, wherein the second online accounts associated with the second online platform comprise one or more fields of second user personally identifiable information, comparing the one or more fields of first user personally identifiable information associated with the at least first one first online account and the one or more fields of second user personally identifiable information associated with the second online account to associate a first user of the first online account with a second user of the second online account, determining an association confidence value indicating a likelihood that the first user of the first online account and the second user of the second online account are a same user, if the association confidence value is below a first predetermined threshold, performing a secondary comparison of one or more fields of first user account information and second user account information to further associate the first user of the first online account with the second user of the second online account to determine an adjusted association confidence value, based on the first user personally identifiable information, the second user personally identifiable information, the first user account information, the second user account information, first account identifying indicia, second account identifying indicia, and at least one of the association confidence value or the adjusted association confidence value, assigning an account migration outcome of the first online account and the second online account, and performing the assigned account migration outcome of the first online account and the second online account.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
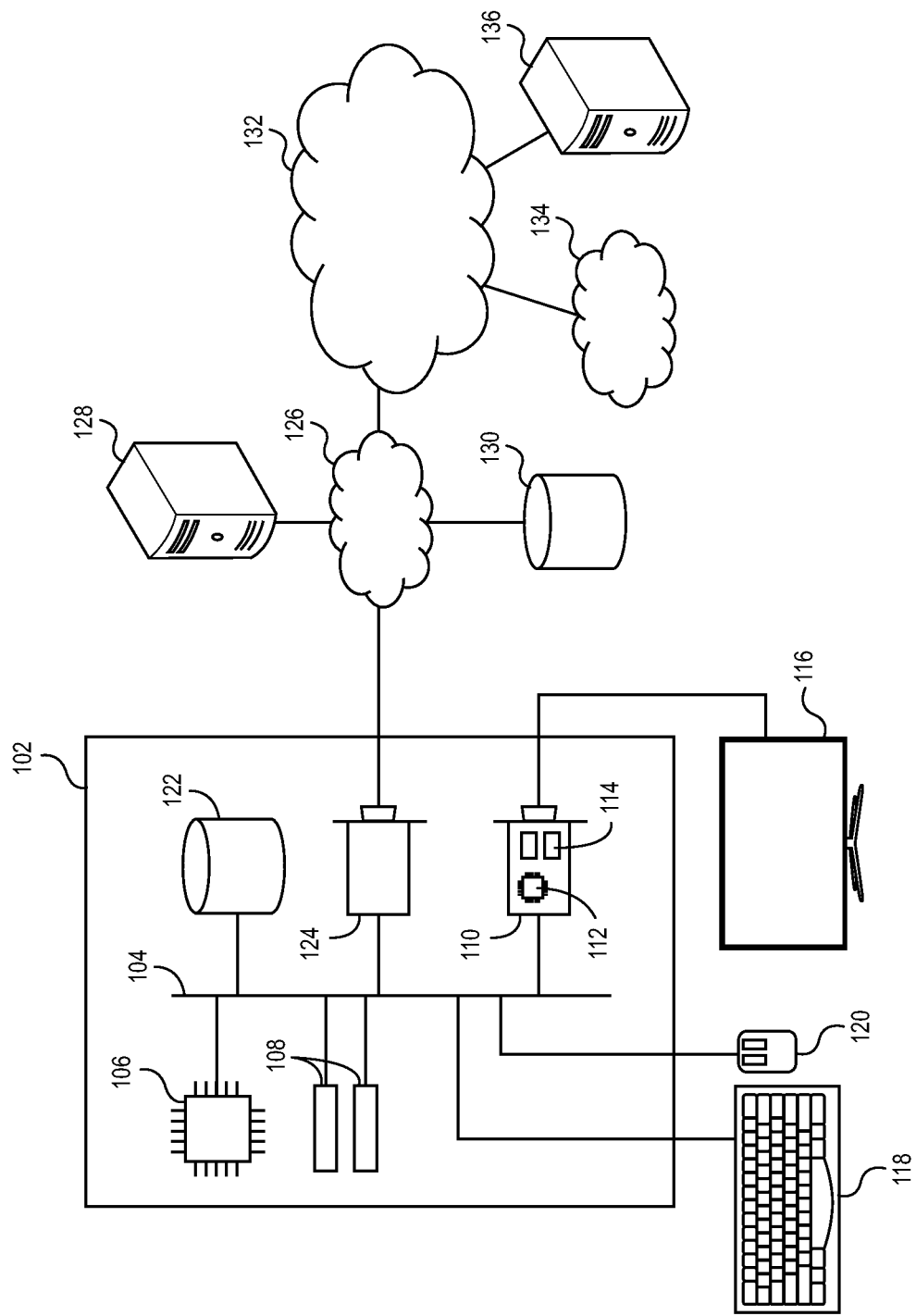
FIG. 1 depicts an exemplary hardware platform for certain embodiments of the invention.

The drawing figures do not limit the current invention to the specific embodiments disclosed and described herein.

The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Broadly, embodiments of the invention provide for systems and methods of migrating and/or consolidating of a plurality of online accounts associated with a plurality of online platforms or systems into a single online account associated with an online platform. In some embodiments, the invention may provide for an initial comparison of two or more online accounts and provide an initial confidence value of the likelihood that the two or more online accounts are possible matches and/or are associated with the same user. Furthermore, in some embodiments, dependent on the initial confidence value, a secondary comparison, check sum, sanity check, or otherwise additional comparison between the two or more online accounts may be performed. In some embodiments, the secondary comparison may further include a comparison of personally identifiable information associated with each of the online accounts being compared and the review of patterns of improbable values associated with the online accounts. In some embodiments and described herein, in some embodiments, a machine learning algorithm may be used to filter out known improbable values, or values that are likely to include incorrect or false information that could lead to improper matching between the online accounts. In some embodiments, following the sanity check or second comparison, a migration or merger outcome of the two or more online accounts may be initiated. In some embodiments, and described herein, the migration or merger outcome may result in either of a new account being created or consolidating the accounts together.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
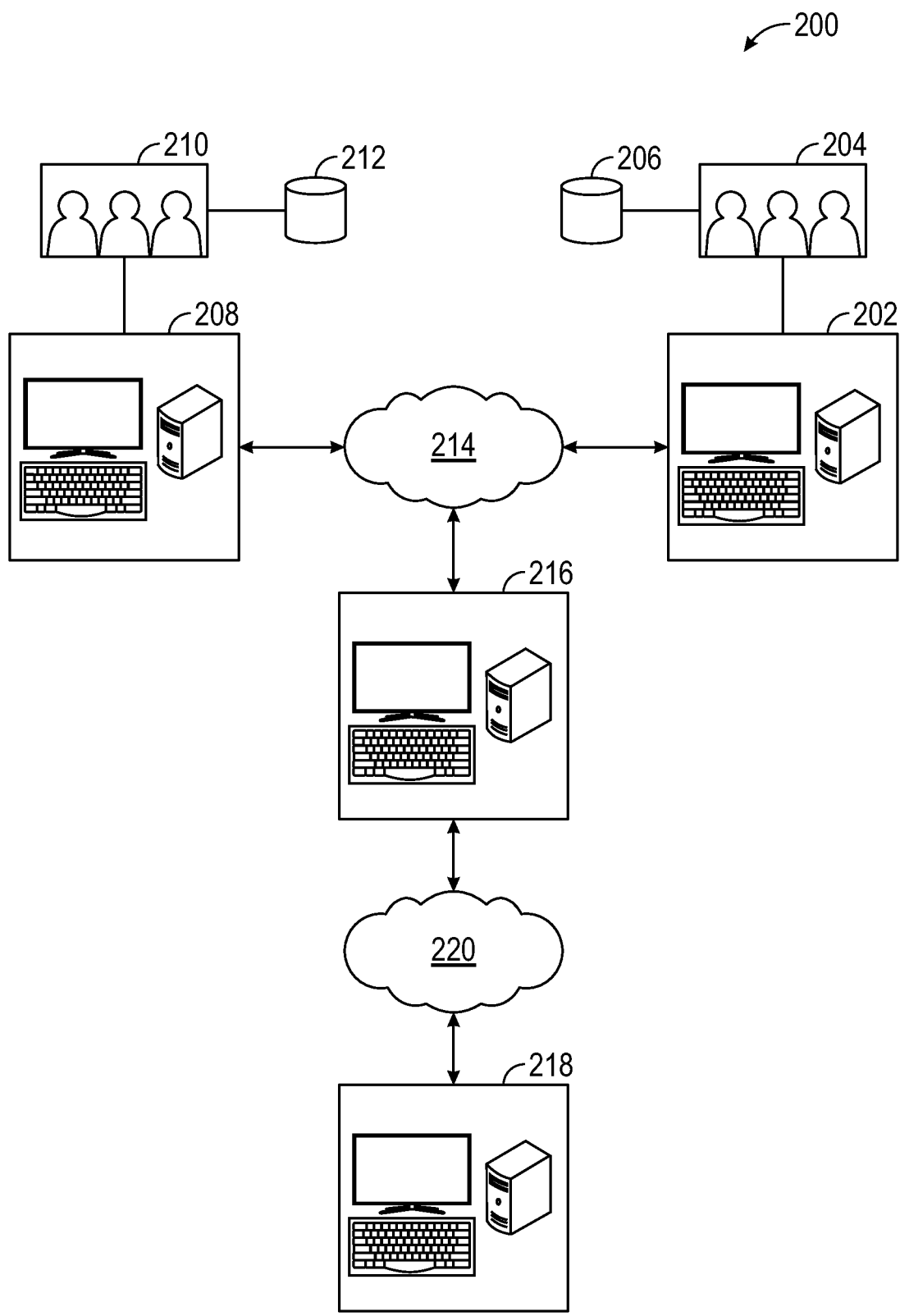
FIG. 2 depicts an exemplary diagram showing a system in accordance with embodiments of the invention.

Turning now to FIG. 2, an exemplary diagram depicting a system in accordance with embodiments of the invention is depicted and generally referenced by the numeral 200. As illustrated in FIG. 2, in some embodiments, system 200 may comprise one or more first online platforms, systems, or databases 202 r associated with at least one first online account 204. In some embodiments, first online platform 202 may be any online platform, system, or database configured for storing one or more online accounts. For example, in some embodiments, first online platform 202 may be a web-based financial service or platform, gaming service or platform, online shopping service or platform, video or music streaming service or platform, or other online service, platform, or system configured for storing one or more online accounts. In some embodiments, online platform 202 may be accessible using any form of computing device discussed above with respect to FIG. 1.

In some embodiments, each of the first online accounts 204 may be an online account associated with a unique user, and storing information directed or associated with the respective users of each of the first online accounts 204. In some embodiments, each of the first online accounts 204 may include personally identifiable information 206 associated with a unique user of the respective online account. In some embodiments, personally identifiable information 206 may be stored or otherwise kept on a server or a database owned or operated by an organization associated with first online platform 202. For example, in some embodiments, personally identifiable information 206 may comprise sensitive data, including for example, birth dates, social security numbers, driver's license numbers and/or other identifiable information associated with specific users. In some embodiments, personally identifiable information 206 may be stored on a secured server or database. Additionally or alternatively, in some embodiments, personally identifiable information 206 may include publicly available identifiable information. For example, in some embodiments, the publicly available information associated with personally identifiable information 206 may include a home or business addresses, phone numbers, or other personally identifiable information that is generally available by public methods. In some embodiments, each of the online accounts 204 may additionally or optionally include private personally identifiable information 206, such as information generally only available on first online platform 202, and the user associated with the specific online account 204. For example, in some embodiments, personally identifiable information 206 may comprise information including, but not limited to, account password recovery question responses, account history, user preferences, or other information that is reasonably sensitive in nature.

In some embodiments, first online accounts 204 associated with first online platform 202 may further comprise an email address, username, or both, associated with each of the online accounts 204 and accordingly with individual users of each of the first online accounts 204. In some embodiments, an email address may be required by each user of a respective online account 204 to register for an account with first online platform 202 and/or for logging into the online account 204.

As further illustrated in FIG. 2, in some embodiments, system 200 may comprise one or more second online platforms, systems, or databases 208 associated with at least one second online account 210. In some embodiments, for example, second online platform 208 may be any of the online platforms, systems, or databases described above with respect to first online platform 202. Additionally, in some embodiments, each of the second online accounts 210 may be an online account associated with or otherwise connected to or more unique users, and storing information directed or associated with the users of each of the second online accounts 210, and as described above with respect to the first online accounts 204. In some embodiments, each of the second online accounts 210 may further comprise or include personally identifiable information 212 associated with each unique user of each of the second online accounts 210, in the manner described above with respect to the first online accounts 204. In some embodiments, the second online accounts 210 associated with second online platform 208 may further comprise an email address, username, or both, associated with each of the second online accounts 210 and accordingly with individual users of each of the second online accounts 210. In some embodiments, an email address may be required by each user of second online account 210 to register for an account with second online platform 208 and/or for logging into second online account 210.

In some embodiments, first online platform 202 and second online platform 208 may be communicatively connected together either through a direct connection, such as for example an ethernet connection, or indirectly by network 214. In some embodiments, network 214 may be Internet 132, or alternatively, may be local area network (LAN), wide-area network (WAN), virtual private network (VPN), or other network for providing communication between the various components of system 200 is contemplated. As further illustrated in FIG. 2, in some embodiments, first online platform 202 and second online platform 208 may be further connected to or otherwise in communication with a first comparison system 216. In some embodiments, first online platform 202 and second online platform 208 may be connected or otherwise in communication with comparison system 216 via network 214. In some embodiments, first online platform 202 and second online platform 208 are connected by a first network 214 and to comparison system 216 via a different network.

In some embodiments, comparison system 216 may be a system for comparing at least one online account 204 associated with first online platform 202 with at least one online account 210 associated with second online platform 208 to thereby identify accounts associated with a common user. In some embodiments, comparison system 216 may be configured to compare a plurality of online accounts 204 associated with first online platform 202 with a plurality of online accounts 210 associated with second online platform 208, at once and in a batch review to determine matching pairs of accounts from first online platform 202 and second online platform 208. Alternatively, in some embodiments comparison system 216 may be configured to compare a single online account 204 with a single online account 210 to determine whether they are associated with a common user. In still other embodiments, comparison system 216 may be configured to review a single online account 204 with a plurality of second online accounts 210 to determine a matching second online account 210. In some embodiments, comparison system 216 may compare personally identifiable information 206 of online accounts 204 with personally identifiable information 212 of online accounts 210. Alternatively or in addition, comparison system 216 may further compare email addresses or usernames associated with online accounts 204 and online accounts 210. The comparison performed by comparison system 216 may utilize decision tables, machine learning, and/or statistical algorithms to compare online account 204 and online account 210 to determine a likelihood that the online accounts are a match. Alternatively, in some embodiments, comparison system 216 may present potential pairs of one online account 204 and one online account 210 to a user for manual review.

In some embodiments, and as described in greater detail below, comparison system 216 may further generate a confidence value or score, representing a determined likelihood that at least one online account 204 is a match with at least one online account 210. In some embodiments, during the comparison between first online account 204 and at least one online account 210 certain information may be given greater weight than other information when determining the confidence value. For example, in some embodiments, comparison system 216 may compare personally identifiable information 206 associated with at least one online account 204 and personally identifiable information 212 associated with at least one online account 210. In some embodiments, the compared personally identifiable information may comprise unique, near unique, or other information that would otherwise be unlikely to be shared between pairs of distinct users. For example, personally identifiable information that should be unique, such as social security numbers or driver's license numbers, may be given more weight when determining the confidence value. Conversely, some personally identifiable information that is not unique or may otherwise be associated with more than one user, such as first names and birth dates, may be given less weight when determining the confidence value.

In some embodiments, and as described in greater detail below, the confidence value determined by comparison system 216 may provide a threshold for performing additional comparison or, alternatively, for automatically creating new user accounts. For example, in some embodiments, if the determined confidence value for a first online account 204 associated with first online platform 202 and a second online account 210 associated with second online platform 208 is below a certain minimum threshold, a determination may be made that there is no match between the accounts. Alternatively, in some embodiments, if the determined confidence value is above a certain minimum threshold, then a determination may be made that there may be a possible match between the two compared accounts. In some embodiments, following a determination that the confidence value is above a certain minimum threshold, a secondary comparison may be used, providing for a secondary validation of the comparison performed by comparison system 216. In some embodiments, if the confidence value is above a second, higher, threshold, no secondary requirement may be performed.

In some embodiments, system 200 may further comprise a secondary comparison system 218, for providing a secondary comparison or validation of results determined by comparison system 216. In some such embodiments, secondary comparison system 218 may be communicatively connected to comparison system 216 either through a direct connection, such as an ethernet connection, or indirectly by network 220. In some embodiments, network 220 may be Internet 132, or alternatively, may be a LAN, WAN, VPN, or other network for providing communication between the various components of system 200. In some embodiments, secondary comparison system may optionally or additionally be communicatively coupled to first online platform 202, second online platform 208, or both.

In some embodiments, secondary comparison system 218 may be a system for providing an additional level of comparison between at least one first online account 204 associated with first online platform 202 and at least one second online account 210 associated with second online platform 208 following the initial comparison by comparison system 216. Alternatively, in some embodiments, secondary comparison system 218 can be used as an initial (or only) comparison of at least one first online account 204 and at least one second online account 210. A secondary validation, such as that performed by secondary comparison system 218, may be particularly advantageous when reviewing data sourced from unreliable sources, or sources lacking (or having less stringent) data verification processes.

In some embodiments, secondary comparison system 218 may be a system for comparing the personally identifiable information, email addresses, and or other identifying information of at least one first online account 204 associated with first online platform 202 with at least one second online account 210 associated with second online platform 208. Like comparison system 216, secondary comparison system 218 may compare accounts many-to-many, one-to-many, or one-to-one. Also like comparison system 216, the comparison performed by secondary comparison system 218 may utilize decision tables, machine learning, and/or statistical algorithms to compare online account 204 and online account 210 to determine a likelihood that the online accounts are a match. Alternatively, in some embodiments, comparison system 218 may present potential pairs of one online account 204 and one online account 210 to a user for manual review.

In some embodiments, secondary comparison system 218 may detect spurious (e.g., unlikely or improbable) data values for accounts and eliminate their use in comparing account information. For example, when setting up an online account, a user selecting a birth date from a drop-down menu, rather than scrolling to find the correct birthdate, might select the default value of January 1 as their birth date, even if incorrect. For this reason, if a user's account lists January 1 as the birth date, the birth date field might be excluded (or given reduced weight) in matching that user account. Similarly, a user who does not wish to disclose their true name may provide a common alias like "John Doe" when prompted for their name, and the name field might be excluded or given reduced weight in matching that user account.

Such spurious data values may be supplied in advance or automatically determined during the process of comparing user accounts. For example, this may be the case for the example of the name "John Doe" given above. Where such data values are supplied in advance, secondary comparison system 218 can exclude such data fields from the comparison, or alternatively, give the data fields less weight when making a determination of a possible match. Further, in some embodiments the algorithm may be able to identify impossible or patently false values as spurious, such as social security numbers comprising more or fewer than 9 digits, users having birthdates that are in the future, or other values that are would otherwise be impossible to be correct. Additionally, some data fields and personally identifiable information may have known or otherwise predictable distributions, and data values not conforming to this distribution can be retroactively excluded after data set has been analyzed. For example, it will be appreciated that birth dates may have a roughly even distribution across a calendar year, and accordingly, an even distribution of users having birthdates can be expected. If, after matching accounts, it is determined that 10% of users have listed their birth date as January 1, this value can be denoted as spurious and be retroactively excluded from use as a data point for matching user accounts.

In some embodiments, secondary comparison system 218 may utilize machine learning algorithms to compare accounts. In some embodiments, the machine learning algorithm may be trained to detect known improbable values (i.e., incorrect information associated with an online account that could result in an increased rate of false mergers or accounts, or which otherwise constitute incorrect information) embedded or otherwise present within the personally identifiable information or other information associated with online accounts 204 and/or online accounts 210. In some embodiments the algorithm may be trained to detect patently incorrect data fields.

In some embodiments, secondary comparison system 218 may optionally or additionally detect unusual or improbable sequences. For example, in some embodiments, one data field that may be used to compare online account 204 with online account 210 may be social security numbers or birth dates. by way of non-limiting example, a social security number comprising sequential digits may be determined to be improbable or unlikely, and accordingly, the secondary comparison system 218 can either exclude that data field from the comparison, or alternatively, give that data field less weight when making a determination of a possible match.

In some embodiments, secondary comparison system 218 may optionally or additionally detect duplications of unique data fields. For example, certain data fields, including, but not limited to social security numbers, account numbers, usernames, or other fields should be unique identifiers, used to identify a particular account or user. Secondary comparison system 218 can detect duplications of such unique data fields associated with more than one user, and can either exclude such duplications from the comparison, or alternatively, give the data fields less weight when making a determination of a possible match.

In some embodiments, secondary comparison system 218 may optionally or additionally be trained to detect user patterns or preference to assist in making a determination of a possible match between at least one online account 204 with at least one online account 210. For example, in some embodiments, metadata associated with online account 204 and/or online account 210 may be used to track or monitor a user's behavior or patterns. For example, a user associated with online account 204 on first online platform 202 may have a pattern of use when using online platform 202, such as for example, watching a particular genre of television shows on particular days or times, playing a set amount of time of an online video game, placing a sports bet on a particular sports team or sports league, or any other pattern of use associated with the different embodiments of online platform 202. Likewise, a user associated with online account 210 on second online platform 208 may similarly have a pattern of use or behavior. In some embodiments, machine learning algorithms can match accounts across platforms based on these patterns of use. For example, a machine learning algorithm may be trained to detect such patterns and used during the comparison of online account 204 and online account 210 and/or in making the determination if online account 204 and online account 210 are a match.

Figure 3:
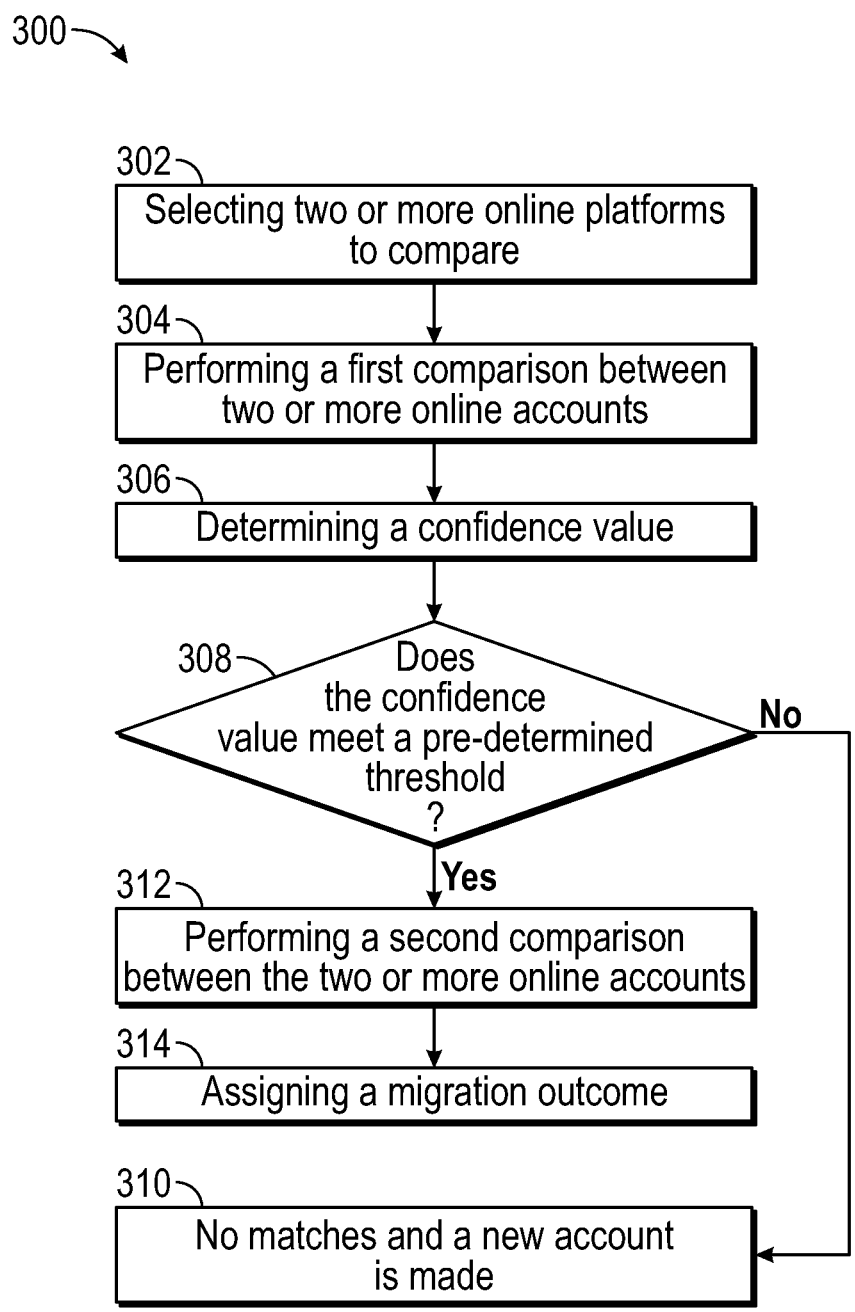
FIG. 3 depicts a flow chart illustrating the operation of a method in accordance with embodiments of the invention.

Turning now to FIG. 3, a flowchart illustrating an exemplary method of comparing and consolidating or migrating two or more online accounts associated with two or more online platforms or systems in accordance with embodiments of the invention is depicted and generally referenced by numeral 300. In some embodiments, method 300 may provide for the eventual migration of online accounts on a first online platform and/or a second online platform. In some embodiments, method 300 may optionally provide for the creation of online accounts on the first online platform and/or the second online platform.

Initially, at step 302, a first online platform comprising at least one online account is selected for comparison with a second online platform comprising at least one online account. In some embodiments, the at least one online account associated with each of first online platform and second online platform may be, for example, any of the online accounts described above with respect to FIG. 2. Additionally, in some embodiments, the first online platform, the second online platform, or both, may be, for example, any of the online platforms as described above with respect to FIG. 2. In some embodiments, additional online platforms may be selected for comparison, and for example, three, four, five, six, or more online planforms comprising one or more online accounts may be added to the comparison of method 300. In some embodiments, each of the online platforms selected for comparison may be communicatively coupled, and for example, may be coupled together through a network, the internet, or other communicative methods.

Next, at step 304, in some embodiments a first comparison between the online accounts associated with the first online platform with online accounts associated with the second online platform may be performed. In some embodiments, the first comparison may be performed by the first comparison system as described above with respect to FIG. 2. In some embodiments, the first comparison between the online accounts associated with the first online platform and online accounts associated with the second online platform may, for example, comprise a comparison between one selected online account associated with the first online platform and a selected online account associated with the second online platform. Alternatively, in some embodiments the first comparison may comprise a comparison between a plurality of online accounts associated with the first online platform with a plurality of online accounts associated with the second online platform. In still other embodiments, the comparison may comprise a comparison between one online account associated with the first online platform with a plurality of online accounts associated with the second online platform.

At step 306, a confidence value may be determined as a result of the first comparison of step 304. In some embodiments, the confidence value may be a numerical value representing the likelihood that at least one online account associated with first online platform and at least one online account associated with second online platform are a match or are otherwise associated with the same user. For example, in some embodiments, the confidence value may be a numerical value within a range of 1-100, by way of non-limiting example. In some embodiments, a score of 70 or above may be an indicator that there is an acceptable likelihood of probability that at least one online account associated with first online platform and at least one online account associated with second online platform are a match or are otherwise associated with the same user. Alternatively, in some embodiments, the confidence value may be a textual or otherwise descriptive identification on the likelihood that the accounts may be a match. For example, in some embodiments, the confidence value may provide a description on the likelihood that at least one online account associated with first online platform and at least one online account associated with the second online platform are a match or are otherwise associated with the same user. For example, in some embodiments, the confidence value may be provided by a written description providing indicators such as "high likelihood"; "medium likelihood"; or "low likelihood." Alternatively, in some embodiments, the confidence value may be a binary report indicating affirmatively that either that: (a) at least one online account associated with the first online platform and at least one online account associated with the second online platform are a match or are otherwise associated with the same user; or (b) at least one online account associated with the first online platform and at least one online account associated with the second online platform are not a match or are otherwise not associated with the same user. A person of skill in the art, having reviewed this disclosure, will appreciate that a variety of types of confidence score may be utilized in place of those described, and all such types of confidence score are contemplated as being within the scope of the invention.

At test 308, a determination can be made of whether the determined confidence value has met or exceeded a predetermined minimum threshold of likelihood that at least one account associated with the first online platform is a match with at least one account associated with a second online platform. For example, in the exemplary step 306 the confidence value may comprise a numerical range from 1-100. In some embodiments, a predetermined value may be established as a minimum threshold of likelihood of a match. For example, in the exemplary embodiment in which the confidence value is based on a numerical range from 1-100, a confidence value of seventy (70) may be a minimum threshold that at least one account associated with the first online platform is a match with at least one account associated with the second online platform. Alternatively, in some embodiments the confidence value in the exemplary embodiment may comprise any numerical number within the numerical range as the minimum threshold that at least one account associated with the first online platform is a match with at least one online account associated with the second online platform.

Following test 308, if the confidence value is below the minimum threshold, a determination may be made that at there is no match, or a very low likelihood of a match, between at least one online account associated with the first online platform with at least one online account associated with the second online platform, triggering step 310. By way of non-limiting example, in the exemplary embodiment described at test 308, if the confidence value is below a score of 70, it may be determined that there is no match between at least one online account associated with the first online platform with at least one online account associated with the second online platform. Following the triggering event, in some embodiments, step 310 may comprise the creation of a new online account associated with at least one user. In some embodiments, the newly created online account may be associated with the first online platform, the second online platform, or alternatively another online platform separate from first online platform and/or second online platform.

Following test 308, if the confidence value is above the minimum threshold, then a determination may be made that there is a possible match between at least one online account associated with the first online platform with at least one online account associated with the second online platform. At step 312, a secondary comparison may be conducted of the results of the first comparison of step 304, as described above. In some embodiments, step 312 may be performed using secondary comparison system 218 as described in FIG. 2, or alternatively, may comprise another secondary comparison of data sets.

In some embodiments, step 312 may comprise a multiple stage review of personally identifiable information, email accounts, usernames, metadata, user patterns, or other information associated with the at least one online account from first online platform and the at least one online account from the second online platform that have been deemed as possible matches following test 308. For example, in some embodiments, an initial review may comprise a review of the names associated with the possible matching online accounts from the first online platform and the second online platform. In some embodiments, names of users may be compared for exact or fuzzy matches. In some embodiments, step 312 may optionally or additionally comprise a review of the birthdates of the potentially matching online accounts from first online platform and the second online platform. In some embodiments, step 312 may optionally or additionally comprise a review of social security numbers associated with each of the potentially matching online accounts from first online platform and second online platform. In some embodiments, step 312 may optionally or additionally comprise a review of email addresses associated with each of the potentially matching online accounts from first platform and second online platform. In some embodiments, step 310 may optionally or additionally comprise additional review of any other personally identifiable information associated with each of the potentially matching online accounts from first online platform and second online platform, including but not limited to driver's license numbers, financial information (i.e. credit card numbers, checking accounts, platform specific financial account, or other financial information), usernames, account numbers, user preferences, user behaviors, or any other personally identifiable information associated with each of the online accounts associated with the first online platform and/or the second online platform, providing for an increased probability of determining correct likelihoods that accounts are matching. In some embodiments, the comparison performed during step 310 may comprise the intentional exclusion, or reduced weight given, to known improbable values. In some embodiments, the known improbable values may be excluded or accounted for using the system described in FIG. 2. In some embodiments, the exclusion or accounting of known improbable values may aid in determining a likelihood of a match between online accounts, while reducing or eliminating the possibility of false matches.

At step 312, a migration outcome may be assigned and based at least in part on the comparison of the at least one online account associated with the first online platform and at least one online account associated with the second online platform. As described in greater detail below, in some embodiments the migration outcome result in, for example, creating a new online account, consolidating credentials from an online account associated with the second online platform with an online account associated with the first online platform, creating a shell online account, or other migration outcomes.

Figure 4:
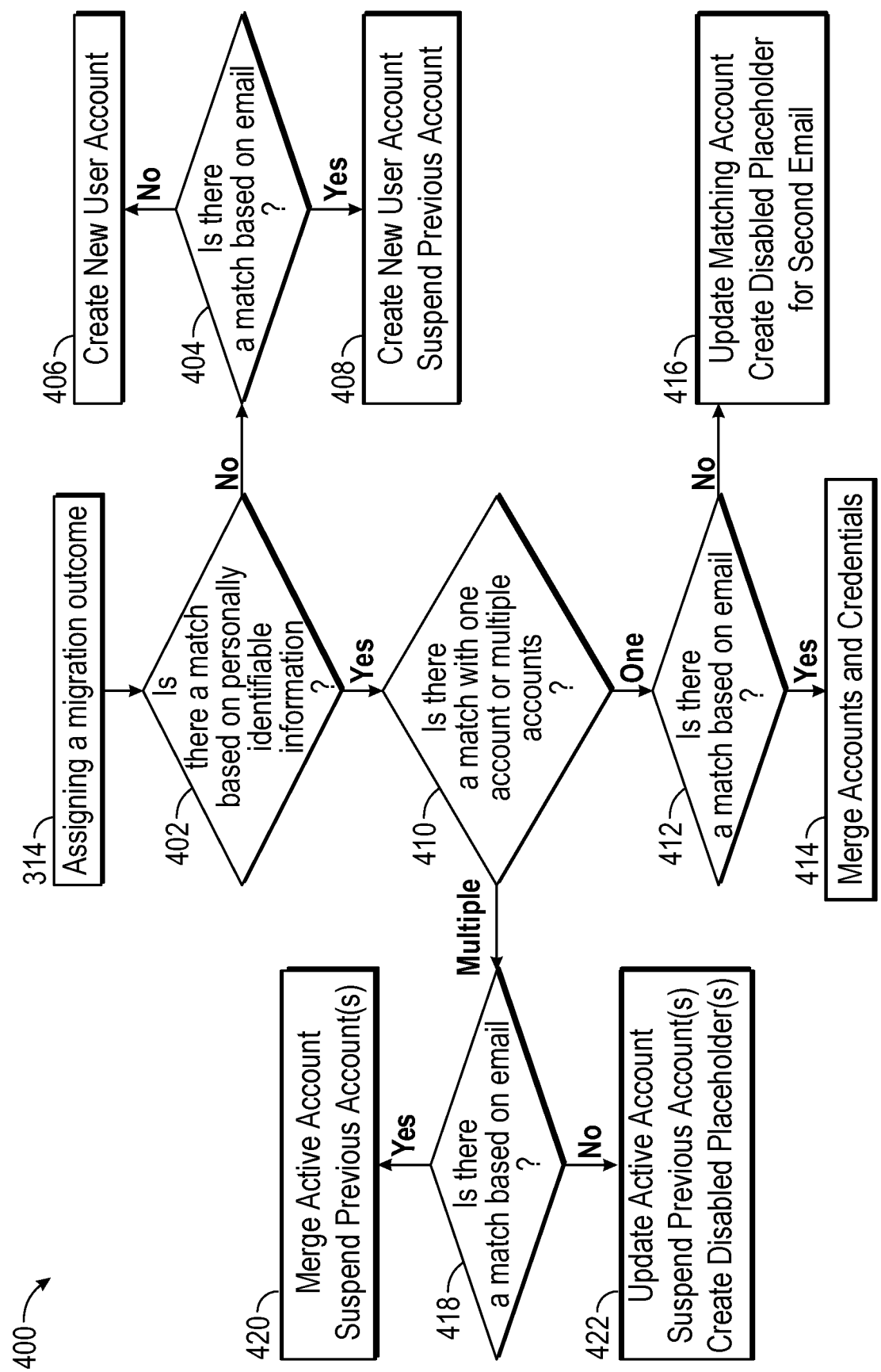
FIG. 4 depicts a flow chart illustrating the operation of a method of assigning a migration outcome in accordance with embodiments of the invention.

Turning now to FIG. 4, an exemplary flowchart illustrating a method for determining the exemplary migration outcome results of step 312 as described in FIG. 3 in additional detail is depicted and is referred to generally as reference numeral 400. In some embodiments, migration result of step 312 may be dependent on the available personally identifiable information, emails, or other information associated with each of the online accounts. As an example scenario illustrating the use of method 400, consider the case where two companies with distinct but overlapping user bases are merging and wish to create a common login system such that each user has a single account on the first company's system. Further complicating the scenario, some users may have duplicate accounts on one system or the other that should also be merged.

At test 402, for any given user of the second system, a determination is made as to whether there is a match between at least one first online account associated with the first online platform and the at least one second online account associated with the second online platform based on personally identifiable information associated with each of the online accounts. For example, the personally identifiable information associated with each of the online accounts may be the personally identifiable information reviewed and compared in step 312. Alternatively, the confidence value for matching the personally identifiable information may have been above the threshold requiring the second comparison.

If the determination from test 402 is that there is not a match between at least one first online account associated with the first online platform and the at least one second account associated with the second online platform then processing proceeds to test 404. In some embodiments, at test 404, a determination can be made of whether there is a match between account identifying indicia associated with at least one first online account associated with the first online platform and at least one second online account associated with the second online platform. For the sake of concreteness, this disclosure uses the email addresses associated with the respective online accounts as the account identifying indicia; however, any unique information identifying the accounts, such as a username or profile photo, can be used instead. If the result of test 404 determines that there is no match between the email address for the at least first one online with an email for at least one second online account associated, then it is determined that the user of the second system has no matching account on the first system, and migration outcome 406 may be initiated. In some embodiments, migration outcome 406 may result in the creation of a new online account for the user of the second system on first online platform. Additionally, in some embodiments migration outcome 406 may further include the migration of account details such as credentials, personal information, financial information, or other information associated with at least one online account associated with second online platform to the newly created account on the first online platform.

If the result of test 404 determines that there is a match between and email address for a first online account associated with the first online platform and an email address associated with a second online account associated with the second online platform based on an email match, then migration outcome 408 may be initiated. In some embodiments, migration outcome 408 may result in the creation of a new online account on the first online platform and may further include the migration of account details such as credentials, personal information, financial information, or other information associated with at least one online account associated with second online platform to the newly created account on online platform. In other embodiments, no migration of account details is performed unless manually initiated by the user, or until the user confirms that the two accounts are associated with the same individual. Migration outcome 408 may further comprise suspending, locking, or limiting access to the previous online account associated with the first online platform. In some embodiments, migration outcome 408 may optionally or additionally comprise sending a status update, email, or other form of communication to the user of the suspended online account, informing the user that a new account has been created and optionally that it has been populated with information from the second online platform.

In some embodiments, if the determination from test 402 is that there is a match between one or more first online accounts associated with the first online platform and the second online account associated with the second online platform based on personally identifiable information, then test 410 is performed to determine whether there is a potential match between one online account associated with the first online platform and one online account associated with the second online platform or if there is a match between more than one online account associated with first online platform and one account associated with the second online platform. If the result of test 410 determines that there is a match between one online account associated with first online platform and one online account associated with second online platform then processing proceeds to test 412.

In some embodiments, at test 412 a determination can be made on whether there is a matching email address associated with the first online account associated with the first online platform and the second account associated with the second online platform. In some embodiments, if test 412 determines that there is an email address match between the online account associated with the first online platform and the online account associated with the second online platform, then it can be determined that the two accounts are associated with the same individual and migration outcome 414 may be initiated. In some embodiments, migration outcome 414 may comprise migrating the credentials, personal information, financial information, or other information associated with the online account associated with second online platform and consolidating the migrated information to the online account associated with the first online platform. In some embodiments, migration outcome 414 may optionally or additionally comprise sending a status update, email, or other form of communication to the user of the online account, informing the user that their account has been updated.

In some embodiments, if the determination from test 412 determines that there is not an email address match between the first online account associated with the first online platform and the second online account associated with the second online platform, then it can be determined that the same individual used different accounts for the different systems and migration outcome 416 may be initiated. In some embodiments, migration outcome 416 may comprise migrating the credentials, personal information, financial information, or other information associated with the online account associated with second online platform and consolidating the migrated information to the online account associated with the first online platform. In some embodiments, migration outcome 416 may further comprise creating a new online account shell on the first online platform, which may store the credentials, personal information, financial information, or other information associated with the first online account associated with the first online account prior to prevent the user from mistakenly creating a new online account on the first online platform with old, outdated, or otherwise non-applicable credentials. In some embodiments, migration outcome 416 may further comprise marking or identifying the new online account shell as a duplicate account. A prompt may additionally or optionally be communicated to the user in the event that the user attempts to access the online account using the old credentials.

In some embodiments, if the result of test 410 determines that there is a match between more than one first online account associated with first online platform and the second online account associated with second online platform based on personally identifying information, then processing proceeds to test 418. For example, one online account associated with the first online platform may be an active account and one or more other first online accounts may be duplicate or dormant accounts. In some embodiments, test 418 may be used to determine whether there is a match based on the email address associated with each of the possibly matching first online accounts. If the determination from test 418 indicates that there is a match between an email address associated with one of the first online accounts associated with the first online platform and the email address associated with the second online account associated with second online platform, it is determined that the active account corresponds to the user of the second online account, and mitigation outcome 420 takes place.

In some embodiments, migration outcome 420 may comprise migrating the account details, such as credentials, personal information, financial information, or other information associated with the second online account associated with second online platform and consolidating it with the active first online account associated with the first online platform. In some embodiments, migration outcome 420 may further comprise updating the duplicate or dormant account(s) having a different email address with migrated credentials, personal information, financial information, or other information associated with the online account associated with second online platform. In some embodiments, migration outcome 420 may further comprise marking or identifying the duplicate or dormant account as a duplicate account and suspending it. A prompt identifying the active account may additionally or optionally be presented to the user in the event that the user attempts to access the online account using old credentials.

In some embodiments, if the result of test 418 determines that there is a match of one online account associated with the second online platform with multiple first online accounts associated with the first online platform based on matching personally identifiable information then migration outcome 422 may be initiated. For example, this may be the case where a first online account is matched based on personally identifiable information only and another match with a second online account associated with the first online platform based on a matching email address only. Alternatively, it may be the case that multiple first online accounts associated with the first online platform based on matching personally identifiable information, none of which match the email address associated with the second online account. In some embodiments, migration outcome 422 may comprise migrating the credentials, personal information, financial information, or other information associated with the second online account associated with second online platform and consolidating the migrated information to the active online account associated with the first online platform having corresponding personally identifiable information. In some embodiments, migration outcome 422 may further comprise creating a new online account shell on the first online platform, which may store the credentials, personal information, financial information, or other information associated with the online account associated with the first online account prior to the data migration to prevent a user from creating a new online account on the first online platform with old, outdated, or otherwise non-applicable credentials. In some embodiments, migration outcome 422 may further comprise marking or identifying the new online account shell as a duplicate account. A prompt may additionally or optionally be displayed to the user in the event that the user attempts to access the online account using the old credentials. In some embodiments, migration outcome 422 may further comprise suspending, locking, or otherwise blocking access to the online account associated with first online platform having a matching email address with the online account associated with second online platform, but having different personally identifiable information. In some embodiments, migration outcome 422 may optionally or additionally comprise sending a status update, email, or other form of communication to the user of the suspended online account, informing the user that their account has been suspended.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor perform a method of comparing and migrating online user accounts, the method comprising:
   receiving first account information comprising a first plurality of fields of first-user personally identifiable information associated with a first user;
   receiving second account information comprising a second plurality of fields of second-user personally identifiable information associated With a second user;
   performing a first comparison of a first data set from the first plurality of fields and a first data set from the second plurality of fields;
   storing a first result associated with the first comparison;
   determining and storing, based on the first result of the first comparison, an association confidence value indicating a likelihood that the first user and the second user are a match;
   responsive to determining that the association confidence value is below a predetermined threshold, performing a second comparison of a second data set from the first plurality of fields and a second data set from the second plurality of fields and updating the association confidence value,
   wherein the first data set from the first plurality of fields and the first data set from the second Plurality of fields are associated with a first sensitivity level of personally identifiable information and the second data set from the first plurality of fields and the second data set from the second plurality of fields are associated with a second sensitivity level of personally identifiable information, wherein the second sensitivity level is a higher level of sensitivity compared to the first sensitivity level;
   storing a second result associated with the second comparison;
   excluding one or more spurious data fields from at least one of the first data set from the first plurality of fields, the first data set from the second plurality of fields, the second data set from the first plurality of fields, or the second data set from the second plurality of fields during the first comparison or the second comparison,
   wherein the one or more spurious data fields are determined by a machine learning algorithm, wherein the machine learning algorithm is trained to detect impossible or patently false data fields and unlikely or improbable distributions of known data fields;
   assigning an account migration outcome, wherein the account migration outcome is based at least in part on the association confidence value or an updated stored association confidence value based on the second result from the second comparison,
   wherein the account migration outcome comprises a merger between a first account associated with the first account information and a second account associated with the second account information;
   storing the account migration outcome;
   transmitting the account migration outcome to an online platform; and
   causing the account migration outcome to occur at the online platform.

2. The one or more non-transitory computer-readable media of claim 1, further comprising:
   responsive to receiving updated or additional information associated with the one or more spurious data fields, updating the account migration outcome; and
   causing an updated account migration outcome to occur at the online platform.

3. A method for consolidating one or more online accounts, the method comprising:
   receiving first account information comprising a first plurality of fields of first-user personally identifiable information associated with a first user;
   receiving second account information comprising a second plurality of fields of second-user personally identifiable information associated with a second user;
   performing a first comparison of a first data set from the first plurality of fields and a first data set from the second plurality of fields;
   storing a result associated with the first comparison;

determining and storing, based on the result of the first comparison, an association confidence value indicating a likelihood that the first user and the second user are a match;

responsive to determining that the association confidence value is below a predetermined threshold, performing a second comparison of a second data set from the first plurality of fields and a second data set from the second plurality of fields and updating the association confidence value, wherein the first data set from the first plurality of fields and the first data set from the second plurality of fields are associated with a first sensitivity level of personally identifiable information and the second data set from the first plurality of fields and the second data set from the second plurality of fields are associated with a second sensitivity level of personally identifiable information, wherein the second sensitivity level is a higher level of sensitivity compared to the first sensitivity level;

identifying one or more spurious data fields from at least one of the first data set from the first plurality of fields, the first data set from the second plurality of fields, the second data set from the first plurality of fields, or the second data set from the second plurality of fields during the first comparison or the second comparison;

including, during the first comparison or the second comparison, the one or more spurious data fields such that a lower weight is given to the one or more spurious data fields than a weight given to non-spurious data fields when performing the first comparison or the second comparison, wherein the one or more spurious data fields are determined by a machine learning algorithm, wherein the machine learning algorithm is trained to detect impossible or patently false data fields and unlikely or improbable distributions of known data fields;

assigning an account migration outcome, wherein the account migration outcome is based at least in part on the association confidence value, wherein the account migration outcome comprises a merger between a first account associated with the first account information and a second account associated with the second account information;

storing the account migration outcome;

transmitting the account migration outcome to an online platform; and causing the account migration outcome to occur at the online platform.

4. The method of claim 3, wherein the one or more spurious data fields include one or more fields that are impossible or patently false and excluding impossible or patently false fields from the comparison.

5. The method of claim 3, further comprising:
determining one or more data fields associated with a known or otherwise predictable distribution;
detecting one or more fields of spurious data comprising a non-conforming association to the known or otherwise predictable distribution; and
excluding the one or more spurious data fields comprising the non-conforming association from the first comparison or the second comparison.

6. The method of claim 3, wherein the one or more spurious data fields comprise one or more unusual or improbable sequences in the first data set from the first plurality of fields or the first data set from the second plurality of fields.

7. The method of claim 6, wherein the one or more spurious data fields comprise duplications of unique data fields including social security numbers, account numbers, or usernames used to identify a unique account or unique user.

8. The method of claim 3, further comprising:
detecting a first user behavior pattern associated with the first user; and
detecting a second user behavior pattern associated with the second user;
wherein the first comparison of the first data set from the first plurality of fields and the first data set from the second plurality of fields utilizes the first user behavior pattern and the second user behavior pattern.

9. The method of claim 8, wherein each of the first user behavior pattern and the second user behavior pattern comprises at least one of: user online activity, user television show genre preferences, user television watching durations and frequencies; user video game playing time durations and frequencies; or user gambling behavior.

10. A system comprising at least one processor and at least one non-transitory memory storing computer-executable instructions that, when executed by the at least one processor, cause the system to carry out actions comprising:
receive first account information comprising a first plurality of fields of first-user personally identifiable information associated with a first user;
receive second account information comprising a second plurality of fields of second-user personally identifiable information associated with a second user;
perform a first comparison of a first data set from the first plurality of fields and a first data set from the second plurality of fields;
store a result associated with the first comparison;
determine and store, based on the result of the first comparison, an association confidence value indicating a likelihood that the first user and the second user are a match;
responsive to determining that the association confidence value is less than a first threshold and greater than a second threshold, perform a second comparison of a second data set from the first plurality of fields and a second data set from the second plurality of fields and update the association confidence value,
wherein the first data set from the first plurality of fields and the first data set from the second plurality of fields are associated with a first sensitivity level of personally identifiable information and the second data set from the first plurality of fields and the second data set from the second plurality of fields are associated with a second sensitivity level of personally identifiable information, wherein the second sensitivity level is a higher level of sensitivity compared to the first sensitivity level;
identify one or more fields of spurious data from at least one of the first data set from the first plurality of fields, the first data set from the second plurality of fields, the second data set from the first plurality of fields, or the second data set from the second plurality of fields during the first comparison or the second comparison,
wherein the one or more fields of spurious are determined by a machine learning algorithm, wherein the machine learning algorithm is trained to detect impossible or patently false data fields and unlikely or improbable distributions of known data fields;

assign an account migration outcome, wherein the account migration outcome is based at least in part on the association confidence value, wherein the account migration outcome comprises a merger between a first account associated with the first account information and a second account associated with the second account information;

storing the account migration outcome;

transmit the account migration outcome to an online platform; and cause the account migration outcome to occur at the online platform.

11. The system of claim 10, wherein the association confidence value is a binary indicator, indicating that the first user matches the second user or that the first user does not match the second user.

12. The system of claim 10, wherein the association confidence value is a non-binary, written description providing a degree of certainty that the first user matches the second user.

13. The system of claim 12, further comprising:

responsive to determining that the association confidence value is greater than the first threshold, determine the first user matches the second user; and assign a corresponding account migration outcome from a plurality of account migration outcomes.

14. The system of claim 12, further comprising:

responsive to determining that the association confidence value is less than a first threshold, determine the first user does not match the second user; and assign a corresponding account migration outcome.

15. The system of claim 14, wherein the first user is associated with a first remote computing platform the second user is associated with a second remote computing platform, wherein the account migration outcome occurs at either the first remote computing platform or the second remote computing platform.

16. The one or more non-transitory computer-readable media of claim 1, wherein the first sensitivity level and the second sensitivity level are based on whether at least one of a birth date, a social security number, or a driver's license number is present.

17. The one or more non-transitory computer-readable media of claim 1, wherein the first plurality of fields and the second plurality of fields include publicly available identifiable information.

18. The method of claim 3, wherein the first plurality of fields and the second plurality of fields each comprise unique information and non-unique information, wherein the unique information is given more weight than the non-unique information when determining the association confidence value.

19. The method of claim 18, wherein the unique information comprises at least one of a social security number or a driver's license number.

20. The method of claim 18, wherein the non-unique information comprises at least one of a first name or a birthdate.

* * * * *